(12) United States Patent
Kovacs

(10) Patent No.: US 6,915,129 B1
(45) Date of Patent: Jul. 5, 2005

(54) MOBILE AGENT SYSTEM AND METHOD FOR CONTROLLING A MOBILE AGENT SYSTEM

(75) Inventor: Ernö Kovacs, Stuttgart (DE)

(73) Assignee: Sony International (Europe) GmbH, Cologne (DE)

(*) Notice: Subject to any disclaimer, the term of this patent is extended or adjusted under 35 U.S.C. 154(b) by 0 days.

(21) Appl. No.: 09/494,158

(22) Filed: Jan. 28, 2000

(30) Foreign Application Priority Data

Jan. 29, 1999 (EP) .............................................. 99101581

(51) Int. Cl.[7] .............................. H04Q 7/20; G06F 3/00; G06F 15/16

(52) U.S. Cl. ................................ 455/432.3; 455/432.1; 455/422.1; 709/201; 709/202; 719/317; 719/310

(58) Field of Search ........................... 455/414.1, 422.1, 455/432.1, 432.3, 433, 435.1, 435.2, 435.3, 445, 461, 524; 370/328, 331, 338; 707/10, 104.1; 709/200, 201, 202, 203, 205, 221, 223, 225, 227, 238, 317; 719/317, 310

(56) References Cited

U.S. PATENT DOCUMENTS

| | | | |
|---|---|---|---|
| 5,485,634 A | * | 1/1996 | Weiser et al. ................ 455/507 |
| 5,717,747 A | * | 2/1998 | Boyle et al. ........... 379/201.03 |
| 5,825,759 A | * | 10/1998 | Liu ............................. 370/331 |
| 6,085,086 A | * | 7/2000 | La Porta et al. ......... 455/432.3 |
| 6,330,586 B1 | * | 12/2001 | Yates et al. .................. 709/201 |
| 6,496,871 B1 | * | 12/2002 | Jagannathan et al. ....... 719/317 |
| 6,754,691 B1 | * | 6/2004 | Gomi et al. ................. 709/202 |

OTHER PUBLICATIONS

Ku H et al.: "An Intelligent Mobile Agent Framework for Distributed Network Management" IEEE Global Telecommunications Conference, Phoenix, Arizona, vol. 1, Nov. 3, 1997, pp. 160–164, XP000737527.

Ciancarini P et al.: "Pagespace: An Architecture to Coordinate Distributed Applications on the Web" Computer Networks and ISDN Systems, vol. 28, No. 11, May 1, 1996, pp. 941–952, XP004018198.

Artsy Y et al.: "Designing a Process Migration Facility. The Charlotte Experience" Computer, vol. 22, No. 9, Sep. 1, 1989, pp. 47–56, XP000066076.

* cited by examiner

*Primary Examiner*—Vivian Chin
*Assistant Examiner*—Raymond B. Persino
(74) *Attorney, Agent, or Firm*—Frommer Lawrence & Haug LLP; William S. Frommer; Samuel S. Lee

(57) ABSTRACT

The present invention relates to a mobile agent system (1) for a communication unit (5, 6, 7) of a communication system, with at least one mobile agent (3) comprising an allocated agent policy (8), in which migration parameters of the respective mobile agent (3) are defined, migration control means (16) for controlling the migration behavior of a mobile agent (3) in the communication system on the basis of a current migration policy of the mobile agent (3) and current parameters of the communication system. The present invention further relates to a method for controlling such a mobile agent system (1) and allows a flexible way of controlling the migration behavior of mobile agents (3) depending on system parameters.

20 Claims, 4 Drawing Sheets

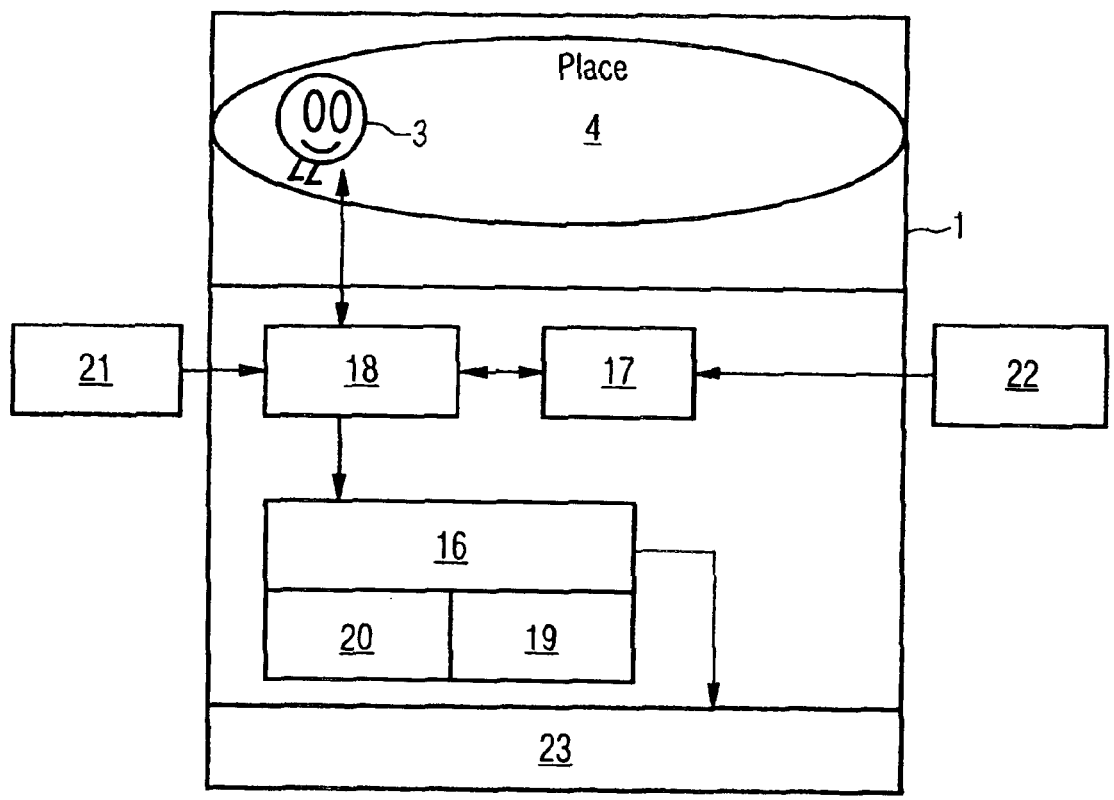

MOBILE AGENT SYSTEM AND METHOD FOR CONTROLLING A MOBILE AGENT SYSTEM

The present invention relates to a mobile agent system for a communication unit of a communication system. The present invention further relates to a method for controlling a mobile agent system in a communication unit of a communication system. Particularly, the communication system can be a wireless telecommunication system and/or a mobile computing system.

Figure 1:
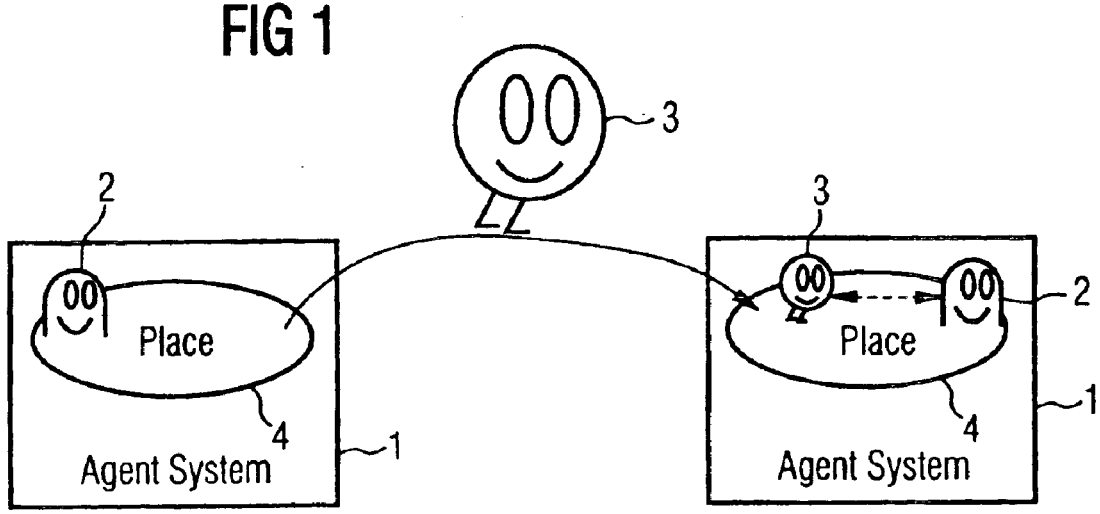

Mobile communication, such as wireless telecommunication or mobile computing, is concerned with providing networked services over wireless networks to mobile users. Mobile agents are a computing paradigm enabling the transfer of an executing piece of code or software from one node of the computer/communication network to another node. In the U.S. Pat. No. 5,603,031, a basic approach to mobile agents is described. The basic operation of mobile agent systems is schematically shown in FIG. 1. An agent system 1 which is implemented in a node of a communication system, e. g. a mobile station or a base station of a wireless telecommunication system or a notebook of a mobile computing system, offers mobile agents 3 an execution environment, which is called a place 4. Mobile agents 3 are pieces of executing software, which can migrate from one agent system 1 to another agent system 1. On all places 4 of the different agent systems 1, the mobile agents 3 can access local services offered by a so-called system agent 2, which is a local piece of executing software.

In the current state of the art mobile agents are migrating between computing nodes of the internet. Because the communication costs in the internet are very low and the available bandwidth is sufficient, the migration step does not cause any problems and as many migration steps as necessary can be performed without significant limitation. However, the communication costs over wireless communication links are high and the available bandwidth is low. The future communication systems will consist of combinations of wireless telecommunication, mobile computing and so on, so that the available quality of service will vary on a large scale as users will move back and forth between high-speed wireless networks and costly low-speed cellular networks.

The object of the present invention is therefore to provide a mobile agent system for a communication unit of a communication system and a method for controlling a mobile agent system in a communication unit of a communication system, which enable to control the migration of mobile agents in an effective and flexible way.

This object is solved by a mobile agent system for a communication unit of a communication system, with at least one mobile agent comprising an allocated agent policy, in which migration parameters of the respective mobile agent are defined, and migration control means for controlling the migration behavior of a mobile agent in the communication system on the basis of a current migration policy of the mobile agent and current parameters of the communication system.

The above object is further solved by a method for controlling a mobile agent system in a communication unit of a communication system, whereby the mobile agent system includes at least one mobile agent comprising an allocated agent policy, in which migration parameters of the respective mobile agent are defined, and the migration behavior of a mobile agent in the communication system is controlled on the basis of a current migration policy of the mobile agent and current parameters of the communication system.

The communication unit might e. g. be a base station or a mobile station of a wireless telecommunication system, a network server or a personal computer of a computing. system. The current parameters of the communication system are e. g. the quality of service information of the current network. The mobile agent migration is controlled so that the mobile agents only migrate if the available current parameters of the communication system match the requirements of the current migration policy of the mobile agent wishing to migrate. The present invention enables a control of the mobile agent migration, which is flexible and adaptable to different requirements.

Advantageously, the mobile agent system according to the present invention further comprises policy managing means for storing a system policy, in which migration behavior parameters for mobile agents of the mobile agent system are defined and policy control means for selecting the current migration policy of a mobile agent on the basis of the allocated agent policy of the mobile agent and the system policy. The system policy can be stored in a system policy data base. Advantageously, the data base comprises a default system policy, in which default migration behavior parameters for all agents in the mobile agent system are defined, and one or more agent type specific policies, whereby the system policy is selected from the default system policy and the corresponding agent type specific policies. Further, the agent policy allocated to a mobile agent can be selected from a default agent policy and a per-migration policy.

Advantageously, the policy control means selects the current migration policy of a mobile agent depending on the type of the provided policies. The provided policies are thereby the allocated agent policy, the system policy and/or the corresponding agent type specific policy. Alternatively, the policy control means selects the current migration policy of a mobile agent depending on additional priority parameters of the provided policies. In an further alternative, the policy control means selects the current migration policy of a mobile agent depending on weighted parameters of the provided policies. Further, a combination of the three above-described ways of selecting the current migration policy can be used.

The mobile agent system according to the present invention can further comprise user input means for inputting a migration policy which is taken as the current migration policy for a mobile agent, overwriting the current migration policy determined by the policy control means. After performing a migration on the basis of the user defined policy, said policy control means always returns to a normal mode for the next migration policy to be selected. Thus, in case that a migration policy is input, this input migration policy overrules the allocated policy, the system policy and/or the agent type specific policy. Alternatively or in combination thereto, the user input means can be provided for inputting a migration mode for the mobile agent system, whereby said input migration mode defines a particular migration policy which is kept by said policy control means until a new migration mode is input.

The mobile agent system according to the present invention can further comprise user operation means for changing the allocated agent policy of a mobile agent, the system policy and/or an agent type specific policy. Further, an application programming interface connected to the migration control means retrieves the communication system parameters, as e. g. the quality of service information.

The migration control means advantageously decides on the basis of a comparison of the current migration policy of a mobile agent and the current parameters of the communication system, if the migration of the mobile agent is allowed, suspended or rejected.

Figure 2:
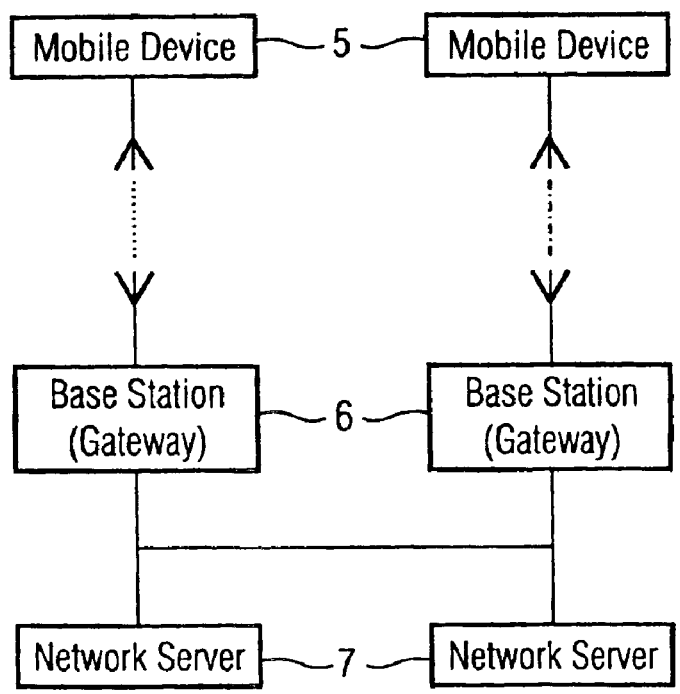
Figure 3:
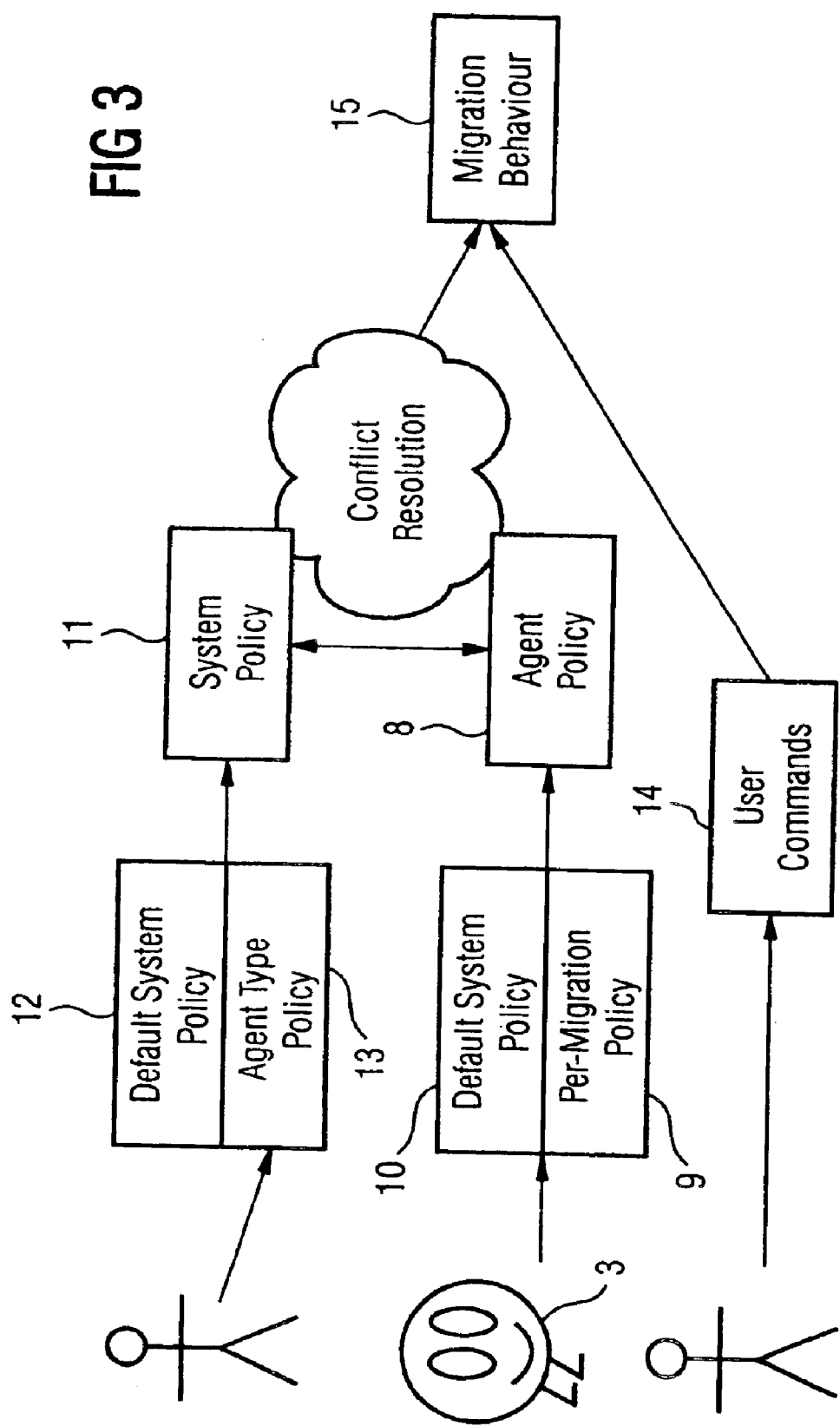
Figure 4:
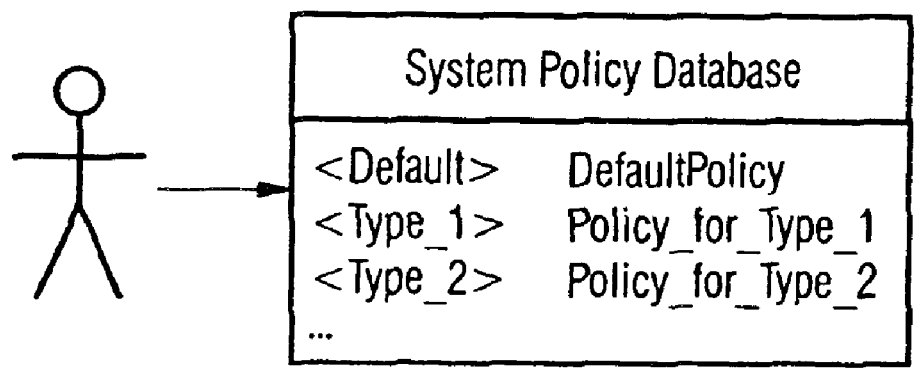
Figure 5:
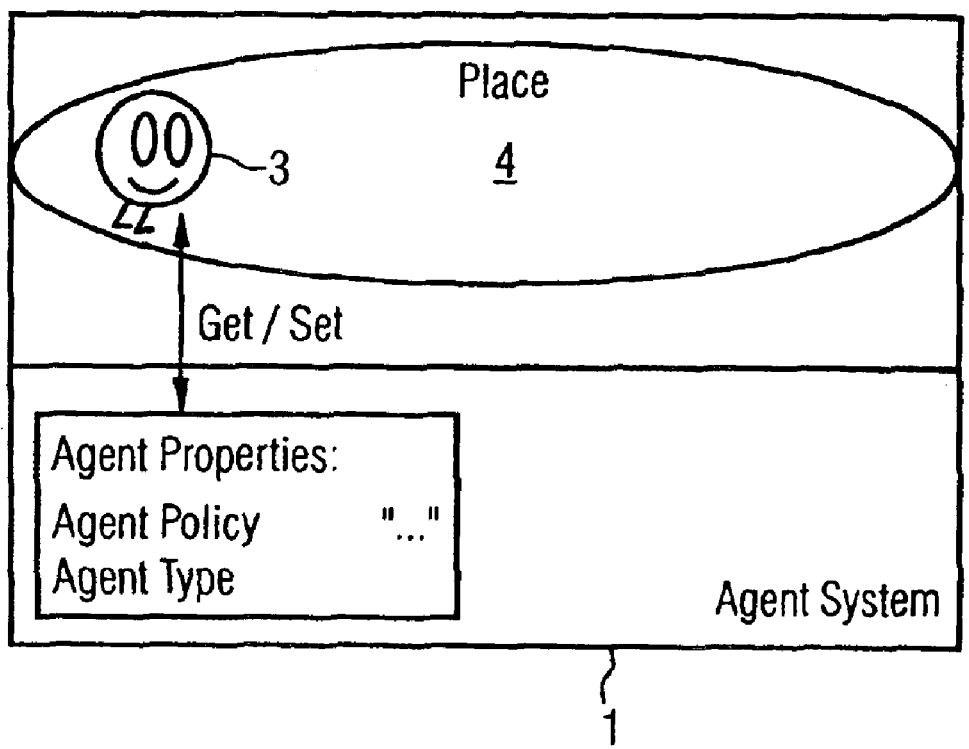

The present invention is described in the following by means of a preferred embodiment relating to the enclosed drawings, in which FIG. 1 shows a basic scheme of a mobile agent migration between agent systems, FIG. 2 shows a basic structure of a wireless telecommunication system, FIG. 3 shows the way of defining and computing the current migration policy according to the present invention, FIG. 4 shows an example for the definition of a system policy, FIG. 5 shows a basic configuration of an agent system according to the present invention, and FIG. 6 shows a detailed configuration of an agent system according to the present invention.

FIG. 1 shows, as stated above, in a general way how mobile agents are used. An agent system 1, which is implemented in a node of a communication system, provides an execution environment, a so-called place 4, for mobile agents 3. A mobile agent is a piece of software, which has one or more execution threads attached to it. It is executed in a dedicated execution environment, which is called a place 4, that controls the actions performed by the mobile agent very tightly. The place 4 is managed by its agent system 1. The mobile agents 3 can migrate from one agent system 1 to another agent system 1, which is implemented in a different node of the communication system. On all places 4, the mobile agents 3 can access local services offered by so-called system agents 2, which are local pieces of executing software.

FIG. 2 shows the basic structure of a wireless telecommunication system comprising mobile devices 5, base stations or gateways 6 and network servers 7. The network servers 7 and the base stations 6 are linked by a wired connection, whereas the mobile devices 5 and the base stations 6 communicate by means of a wireless link. The agent system 1 according to the present invention can be implemented in each of the three different type of nodes of the shown telecommunication system, namely a mobile device 5, a base station 6 or a network server 7.

In the migration process, e. g. if a mobile agent 3 is migrating from a mobile device 5 to a base station 6, the mobile agent is serialized on the respective place 4, and the state and the code of the mobile agent 3 are transferred to the base station 6. There the mobile agent 3 is recreated from the state and the code. Thereafter, the execution of the mobile agent 3 can continue.

The migration process is thereby controlled on the basis of a current migration policy of a mobile agent 3. The current migration policy thereby defines the way the agent system 1 checks the current network parameters and determines the migration behavior of a mobile agent 3. In FIG. 3, the way of defining and computing a current migration policy of a mobile agent 3 is shown. The behavior of a migrating mobile agent 3 is influenced by different principals. The system administrator defines the system policy 11, which can be a default system policy 12 or an agent type policy 13. The default system policy 12 comprises the default behavior parameters for all mobile agents 3 of the agent system 1. In case that the mobile agents 3 used in an agent system 1 can be classified into different agent types, an agent type policy 13 can be defined, in which different type specific policies for the different specific types of mobile agents are defined. In this case, the agent type policy 13 normally overrules the default system policy 12. With the agent type policies, different system behaviors can be associated. For example, most agent systems 1 only differentiate between mobile and stationary agents. Mobile agents are allowed to roam in the network and are tightly controlled. Stationary agents are supplied by the agent system and might access local system resources. Provision of agent type specific policies 13 allows classifying a mobile agent 3 not only according to its basic characteristics, which are defined in the default system policy 12, but also according to other properties and enables thus a more flexible and adaptable control of the migration process of a mobile agent 3.

During the policy determination, the agent system computes the system policy 11 valid for the mobile agent 3 who wants to migrate on the basis of the default system policy 12 and the agent type policy 13.

Every mobile agent 3 has an allocated agent policy 8, which is either a default agent policy 10 or a Per-Migration policy 9. The Per-Migration policy 9 is only valid for the next migration step. A migrating mobile agent 3 always carries its allocated agent policy 8. The agent policy 8 defines parameters of the appropriate mobile agent properties in the agent system 1. Usually, the Per-Migration policy 9 overrules the default agent policy 10 in the next migration step. The conflict resolution required to decide, which of the competing system policy 11 and agent policy 8 are selected to become the current migration policy can be solved in different ways, which are explained below.

Further, the current user can input user commands 14 to influence the current migration policy. Either the policy resulting from the conflict resolution between the system policy 11 and the agent policy 8 or the user command determines the migration behavior 15, which is defined by the current migration policy. Usually, a user command defining the current migration policy directly overrules the policy emerging from the conflict resolution between the system policy 11 and the agent policy 8.

In FIG. 4, a system policy data base is shown, which is defined by an system administrator and stored in the agent system. The system policy data base comprises a default system policy 12 and agent type policies 13, from which the system policy 11 is chosen. In FIG. 5, an agent system 1 with an agent place 4 is shown. A mobile agent 3 in the place 4 has its allocated agent policy 8 stored in the agent properties. The parameters describing the properties of the respective mobile agent 3 are e. g. its owner, its resource constraints etc. The properties can thereby be stored in an agent property data base of the agent system 11. One of the properties stored in the agent property data base can be the agent policy 8.

In case that the mobile agent 3 migrates to another agent system 1, it takes its agent properties along to the other agent system. The agent policy 8 being a part of the agent properties can be changed by a set operation performed e. g. by an operator. A set operation is performed by a mobile agent 3 during execution to retrieve parameters needed for processing.

A policy is described through its type, its name and its set of parameters (<policySpec>) defining the intended behavior of the system. The <policySpec> defines a set of policy parameters, that will be checked when the migration of the mobile agent 3 shall actually be performed.

<policy> ::="POLICY"<policyType>":"<policyName>" ("<policySpec>")".

<policyType> ::=STRING.

<policyName>::=STRING.

<policySpec>::="("<parameterName><parameterValue>")".

<parameterName> ::=STRING.
<parameterValue> ::=STRING.

The parameters of the policies are key/value pairs. The parameters can e. g. be divided into several classes, namely threshold parameters, action parameters and preference parameters. The threshold parameters define limits on the current parameters of the communication system, e. g. network quality of service parameters, which the communication system must meet to allow a migration of a mobile agent 3. The action parameters define parameters for certain actions which the agent system 1 might perform to enforce this particular policy, e. g. action parameters define the timeout values if the mobile agent 3 has to wait for migration, allow the agent system 1 to dial, etc. The preference parameters define preferences of the user in certain situations, e. g. when to decide between different options. The following table gives an example of possible policy parameters:

| Name of Parameter | Description |
| --- | --- |
| MinNetworkSpeed | Minimum Speed of the Network required to allow migration. |
| MaxTransferTime | Maximum Time for Transferring the Agent |
| MaxCostPerMin | Maximum Cost of the Network usage per minute (in the case of connection oriented networks) |
| MaxCostPerByte | Maximum Cost per Byte (in the case of packet oriented networks) |
| SuspendTimeout | Timeout value in case the agent will be suspended |
| doNotSuspend | If the migration policy does not allow the agent to migrate, the agent will not be suspended, but the attempt will be rejected. |

In FIG. 6, the detailed configuration of an agent system 1 according to the present invention is shown. The agent system 1 is implemented in a node of a communication system and comprises a place 4, which is an execution environment for mobile agents 3. The agent system 1 comprises a migration control means 16 connected to a migration means 19 and a suspend means 20. The migration control means 16 is further connected to a policy control means 18 and to an application programming interface 23. The policy control means 18 is connected to a policy managing means 17. The agent policy 8 of a mobile agent 3 of the agent system I is e. g. stored together with other agent properties in the policy control means 18. In the policy managing means 17, the system policy data base for the system policy 11 is stored. The system policy. 11 in the policy managing means 17 can be changed by a user through a user operation means 22 connected to the policy managing means 17.

The migration control means 16 controls the migration behavior of a mobile agent 3 on the basis of a current migration policy of the mobile agent 3 and current parameters of the communication system retrieved over the application programming interface 23. Thereby, the current migration policy of the mobile agent 3 is determined on the basis of the agent policy 8 of the mobile agent 3 and the system policy 11 stored in the policy managing means 17. The policy control means 18 thereby performs a conflict processing to select a respective system policy 11 or agent policy 8 as the current migration policy. This selected current migration policy can be overruled by a direct input from a user over the user input means 21 connected to the policy control means 18. Over the user input means 21, either a migration policy which is taken as the current migration policy for the mobile agent 3 or a migration mode for the mobile agent system 1 can be input. In case that a migration policy as the current migration policy is input through the user input means 21, the policy control means 18 always returns to a normal mode for the next migration policy to be selected, whereas, in case that a migration mode is input, the migration mode is kept by said policy control means 18 until a new migration mode is determined.

The selected current migration policy is supplied from the policy control means 18 to the migration control means 16, which executes the resulting migration behavior by comparing the respective parameters of the resulting current migration policy with the current parameters of the communication system to determine, if a mobile agent 3 may migrate or not. If the mobile agent 3 is allowed to migrate, the migration means 18 transfers the mobile agent 3 to another agent system 1. If the mobile agent 3 is not or not yet allowed to migrate, the suspend means 20 suspends the migration. In case that the migration control means 16 rejects the migration attempt, the mobile agent 3 is restarted and the failure is signaled to the mobile agent 3. In case that the mobile agent 3 is allowed to migrate, the migration means 19 might dial into the communication system and set up a connection for the transmission of the mobile agent 3, e. g. from a mobile device 5 to a base station 6 as shown in FIG. 2.

In the following, different mechanisms for the conflict resolution upon the selection of a current policy from the system policy 11 or the agent policy 8 in the policy control means 18 is described. Since the different policies are defined by several entities, e. g. a current user, a system administrator or the mobile agent 3 itself, a conflict resolution scheme is required if two policies are conflicting. This conflict resolution is performed in the policy control means 18, which takes the conflicting policies, e. g. the system policy 11 from the policy managing means 17 and the agent policy 8 from the mobile agent 3, and determines the resulting policy. For the conflict resolution, different schemes are possible. Firstly, the policy control means 18 can select the current migration policy depending on the type of the provided policies. In this so-called source emphasis strategy, the policy control means 18 will simply emphasize a specific source of the policy, e. g. the agent policy 8 or the system policy 11. Secondly, the policy control means 18 may select the current migration policy depending on additional priority parameters of the provided policies. In this so-called priority strategy, the different policies comprise additional priority parameters defining the respective priority of the policy. The policy control means 18 determines the current policy according to the defined priorities. Thirdly, the policy control means 18 can select the current migration policy depending on weighting parameters of the provided policies. In this case, all possible settings of the policies are weighted. The policy control means 18 selects the policy with the highest weight. The weighting function can be computed such that e. g. more cost-effective strategies gain higher weights. Further, the policy control means 18 can combine several policies by combining the policy parameters of the conflicting policies. In this case, a conflict resolution must be performed for each individual parameter.

By means of the user input means 21 connected to the policy control means 18, a current user might overrule the current policy selected by the policy control means 18 by defining the particular actions or switching to a specific modus. Actions defer from setting a modus in the sense that an action is performed and the agent system returns to the normal modus after the action, namely the migration of a particular mobile agent 3, is terminated. If a user selects a specific modus, the modus will remain selected until the user switches to another modus. Actions will always terminate a special modus and thereafter, the policy control means 18 returns to the normal modus.

Possible actions are e. g. an allow migration action, a stop migration action or an enforce migration action. At an allow migration action, all waiting mobile agents 3 are migrated to the corresponding remote nodes. Further agent migration attempts will be handled using the current migration policy determined by the policy control means 18. At a stop migration action, all migrations are stopped and no other migrations are performed during a predetermined time period. At an enforce migration action, all mobile agents 3 are forced to leave the current agent system 1, which will be enforced by the policy control means 18 and the migration control means 16.

Possible modus settings are e. g. a normal modus, a NoMigration modus, an AllowMigration modus, an AllowDialIn modus or an UseUnusedResources modus. The normal modus is the modus in which the agent system 1 returns, when a normal migration policy is enforced. In the NoMigration modus, ongoing migrations are stopped and no further migrations are attempted. This state continues until the user makes a corresponding input to return to the normal modus. In the AllowMigration modus, a mobile agent 3 might migrate anytime if the communication unit is connected to the communication system. In the AllowDialIn modus, a mobile agent 3 is allowed to migrate anytime. The migrate command will result in a dial-in operation if required. In the UseUnusedResources modus, a mobile agent 3 might migrate, if unused bandwidth is available.

As example, a mobile agent 3 is assumed, which has an allocated default system policy 12 comprising the parameters of a minimum network speed of 9,6 Kbit, maximum costs per minute of 1,-DM and suspension of timeout of 30 minutes. In this case, the migration control means 16 will check if the network speed of the current available network is equal or higher than 9,6 Kbit (which is enough for GSM), and if the costs per minute are not higher than 1,-DM per minute (which is usually the case after 6 p.m.). If one or both of the requirements cannot be achieved, the agent will be suspended. During this time, the conditions will be reevaluated over the application program interface 23 regularly until the agent is allowed to migrate. The suspension of time-out parameter defines that the mobile agent 3 will only be suspended for 30 minutes. After that period the migration attempt is rejected.

The present invention therefore provides a mobile agent system, which can adapt the migration operation to the current parameters of the communication system, thus saving expensive communication costs particularly over wireless networks. Further, the proposed policy mechanism allows a flexible specification of the migration behavior. The proposed policy determination and conflict resolution mechanism allow a definition and enforcement of policies by the system administrator and the mobile agent itself. Further, the proposed overruling mechanism allows a current user of the communication unit to overrule the current migration policy settings, thus giving him full control over the behavior of the agent system.

What is claimed is:

1. Mobile agent system (1) for a communication unit (5, 6, 7) of a communication system, comprising:

at least one mobile agent (3) comprising an allocated agent policy (8), in which migration parameters of the respective mobile agent are defined;

migration control means (16) for controlling the migration behavior of a mobile agent (3) in the communication system on the basis of a current migration policy of the mobile agent (3) and current parameters of the communication system, wherein the current migration policy of the mobile agent defines the way the mobile agent system checks current network parameters; and policy control means for selecting the current migration policy of the mobile agent on the basis of the allocated agent policy of the mobile agent and a system policy, which is a policy selected from a default system policy or an agent type specific policy, said policy control means operating to overrule the selected current migration policy with a user command when the user command defining the current migration policy is received.

2. Mobile agent system (1) according to claim 1, characterized by policy managing means (17) for storing the system policy (11), in which migration behavior parameters for mobile agents (3) of the mobile agent system (1) are defined.

3. Mobile agent system (1) according to claim 2, characterized in, that the policy control means (18) selects the current migration policy of a mobile agent (3) depending on the type of the provided policies.

4. Mobile agent system (1) according to claim 2, characterized in, that the policy control means (18) selects the current migration policy of a mobile agent (3) depending on additional priority parameters of the provided policies.

5. Mobile agent system (1) according to claim 2, characterized in, that the policy control means (18) selects the current migration policy of a mobile agent (3) depending on weighting parameters of the provided policies.

6. Mobile agent system (1) according to claim 2, characterized by user input means (21) for inputting a migration policy which is taken as the current migration policy for a mobile agent (3), whereby said policy control means (18) always returns to a normal mode for the next migration policy to be selected.

7. Mobile agent system (1) according to claim 2, characterized by user input means (21) for inputting a migration mode for the mobile agent system (1), whereby said input migration mode is kept by said policy control means (18) until a new migration mode is input.

8. Mobile agent system (1) according to claim 1, characterized by user operation means (22) for changing the allocated agent policy (8) of a mobile agent (3), and/or the system policy (11).

9. Mobile agent system (1) according to claim 1, characterized by an application programming interface (13) connected to the migration control means (16) for retrieving the current parameters of the communication system.

10. Mobile agent system (1) according to claim 1, characterized in, that said migration control means (16) decides on the basis of a comparison of the current migration policy of a mobile agent (3) and the current parameters of the communication system, if the migration of the mobile agent (3) is allowed, suspended or rejected.

11. Method for controlling a mobile agent system (1) in a communication unit of a communication system, the mobile agent system (1) including at least one mobile agent (3), the method comprising:

defining an allocated agent policy (8), in which migration parameters of the respective mobile agent (3) are defined;

controlling the migration behavior of a mobile agent (3) in the communication system on the basis of a current migration policy of the mobile agent (3) and current parameters of the communication system, wherein the current migration policy of the mobile agent defines the way the mobile agent system checks current network parameters;

selecting the current migration policy of the mobile agent on the basis of the allocated agent policy of the mobile agent and a system policy, which is a policy selected from a default system policy or an agent type specific policy; and overruling the selected current migration policy with a user command when the user command defining the current migration policy is received.

12. Method for controlling a mobile agent system (1) according to claim 11, characterized by storing a system policy (11), in which migration behavior parameters for mobile agents (3) of the mobile agent system (1) are defined.

13. Method for controlling a mobile agent system (1) according to claim 11, characterized in, that current migration policy of a mobile agent (3) is selected depending on the type of the provided policies.

14. Method for controlling a mobile agent system (1) according to claim 11, characterized in, that the current migration policy of a mobile agent (3) is selected depending on additional priority parameters of the provided policies.

15. Method for controlling a mobile agent system (1) according to claim 11, characterized in, that the current migration policy of a mobile agent (3) is selected depending on weighting parameters of the provided policies.

16. Method for controlling a mobile agent system (1) according to claim 11, characterized in, that upon inputting a migration policy which is taken as the current migration policy for a mobile agent (3), the agent system (1) always returns to a normal mode for the next migration policy to be selected.

17. Method for controlling a mobile agent system (1) according to claim 11, characterized in, that upon inputting a migration mode for the mobile agent system (1), said input migration mode is kept until a new migration mode is input.

18. Method for controlling a mobile agent system (1) according to claim 1, characterized by providing a user operation means (22) for changing the allocated agent policy (8) of a mobile agent (3) and/or the system policy (11).

19. Method for controlling a mobile agent system (1) according to claim 11, characterized by retrieving the current parameters of the communication system over an application programming interface (23).

20. Method for controlling a mobile agent system (1) according to claim 11, characterized by deciding on the basis of a comparison of the current migration policy of a mobile agent (3) and the current parameters of the communication system, if the migration of the mobile agent (3) is allowed, suspended or rejected.

* * * * *